United States Patent
Ge et al.

(10) Patent No.: US 12,531,490 B2
(45) Date of Patent: Jan. 20, 2026

(54) POWER SUPPLY DEVICE FOR A HYBRID OR ELECTRIC VEHICLE

(71) Applicant: FORD GLOBAL TECHNOLOGIES, LLC, Dearborn, MI (US)

(72) Inventors: Baoming Ge, Okemos, MI (US); Fan Xu, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 210 days.

(21) Appl. No.: 18/417,364

(22) Filed: Jan. 19, 2024

(65) Prior Publication Data

US 2025/0239943 A1   Jul. 24, 2025

(51) Int. Cl.
| | |
|---|---|
| *H02M 7/00* | (2006.01) |
| *B60L 50/60* | (2019.01) |
| *H02M 1/14* | (2006.01) |
| *H02M 1/32* | (2007.01) |
| *H02M 7/537* | (2006.01) |

(52) U.S. Cl.
CPC ............ *H02M 7/003* (2013.01); *B60L 50/60* (2019.02); *H02M 1/327* (2021.05); *H02M 7/537* (2013.01); *B60L 2210/40* (2013.01); *H02M 1/14* (2013.01)

(58) Field of Classification Search
CPC ......... H02M 1/14; H02M 7/003; H02M 7/537
See application file for complete search history.

(56) References Cited

U.S. PATENT DOCUMENTS

| | | | | |
|---|---|---|---|---|
| 10,314,207 | B1* | 6/2019 | Skalski | ............... H05K 5/0291 |
| 10,798,854 | B2* | 10/2020 | Lei | .................... H05K 7/20872 |
| 10,833,596 | B1* | 11/2020 | Chen | ..................... H02K 11/33 |
| 11,527,456 | B2 | 12/2022 | Gurpinar et al. | |
| 2020/0408809 | A1 | 12/2020 | Esaka et al. | |
| 2022/0345027 | A1 | 10/2022 | Boehmer et al. | |

FOREIGN PATENT DOCUMENTS

| | | |
|---|---|---|
| CN | 109120160 A | 1/2019 |
| WO | 2023044384 A1 | 3/2023 |

* cited by examiner

*Primary Examiner* — Gary A Nash
(74) *Attorney, Agent, or Firm* — David B Kelley; Brooks Kushman P.C.

(57) ABSTRACT

An inverter includes a plurality of pairs of power cards arranged in an array. Each pair has a proximal end and a distal end. The pairs of power cards include switches, DC inputs, DC outputs, and AC outputs. The switches are configured to convert DC power into AC power. The DC inputs are connected to the switches and extend from a first of the power cards within each pair along the distal ends. The DC outputs are connected to the switches and extend from a second of the power cards within each pair along the distal ends. The AC outputs are connected to the switches and extend from the first and the second of the power cards within each pair along the proximal ends.

20 Claims, 5 Drawing Sheets

POWER SUPPLY DEVICE FOR A HYBRID OR ELECTRIC VEHICLE

TECHNICAL FIELD

The present disclosure relates to electric vehicles and power supply devices for electric vehicles.

BACKGROUND

Electric and hybrid vehicles may include power modules that are configured to convert electrical power from direct electrical current (DC) into alternating electrical current (AC) and/or vice versa.

SUMMARY

A vehicle includes an electric machine, a battery, and an inverter. The electric machine is configured to propel the vehicle. The battery is configured to provide electrical power to the electric machine. The inverter is configured to convert DC electrical power from the battery into AC electrical power and to deliver the AC electrical power to the electric machine. The inverter comprises a plurality of power cards and at least one DC link capacitor. The plurality of power cards is arranged in a plurality of pairs. AC output terminals are disposed along proximal ends of each power card. DC input terminals are disposed along distal ends of a first of the power cards within each pair of the power cards. DC output terminals are disposed along distal ends of a second of the power cards within each pair of the power cards. The pairs of power cards are arranged in an array such that the DC input terminals are linearly aligned and the DC output terminals are linearly aligned. The at least one DC link capacitor is connected to each of the DC input terminals and each of the DC output terminals.

An inverter includes a plurality of pairs of power cards arranged in an array. Each pair has a proximal end and a distal end. The pairs of power cards include switches, DC inputs, DC outputs, and AC outputs. The switches are configured to convert DC power into AC power. The DC inputs are connected to the switches and extend from a first of the power cards within each pair along the distal ends. The DC outputs are connected to the switches and extend from a second of the power cards within each pair along the distal ends. The AC outputs are connected to the switches and extend from the first and the second of the power cards within each pair along the proximal ends.

An inverter includes a plurality of power cards arranged in columns and rows. Each power card includes switches configured to convert DC power into AC power. Each column includes a DC input, a DC output, and an AC output. The DC inputs are each connected to the switches of the corresponding column and extend from a first of the power cards within the corresponding column along a first end of the corresponding column. The DC outputs are each connected to the switches of the corresponding column and extend from a second of the power cards within the corresponding column along the first end of the corresponding column. The AC outputs are each connected to the switches of the corresponding column and extend from each of the power cards within the corresponding column along a second end of the corresponding column.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
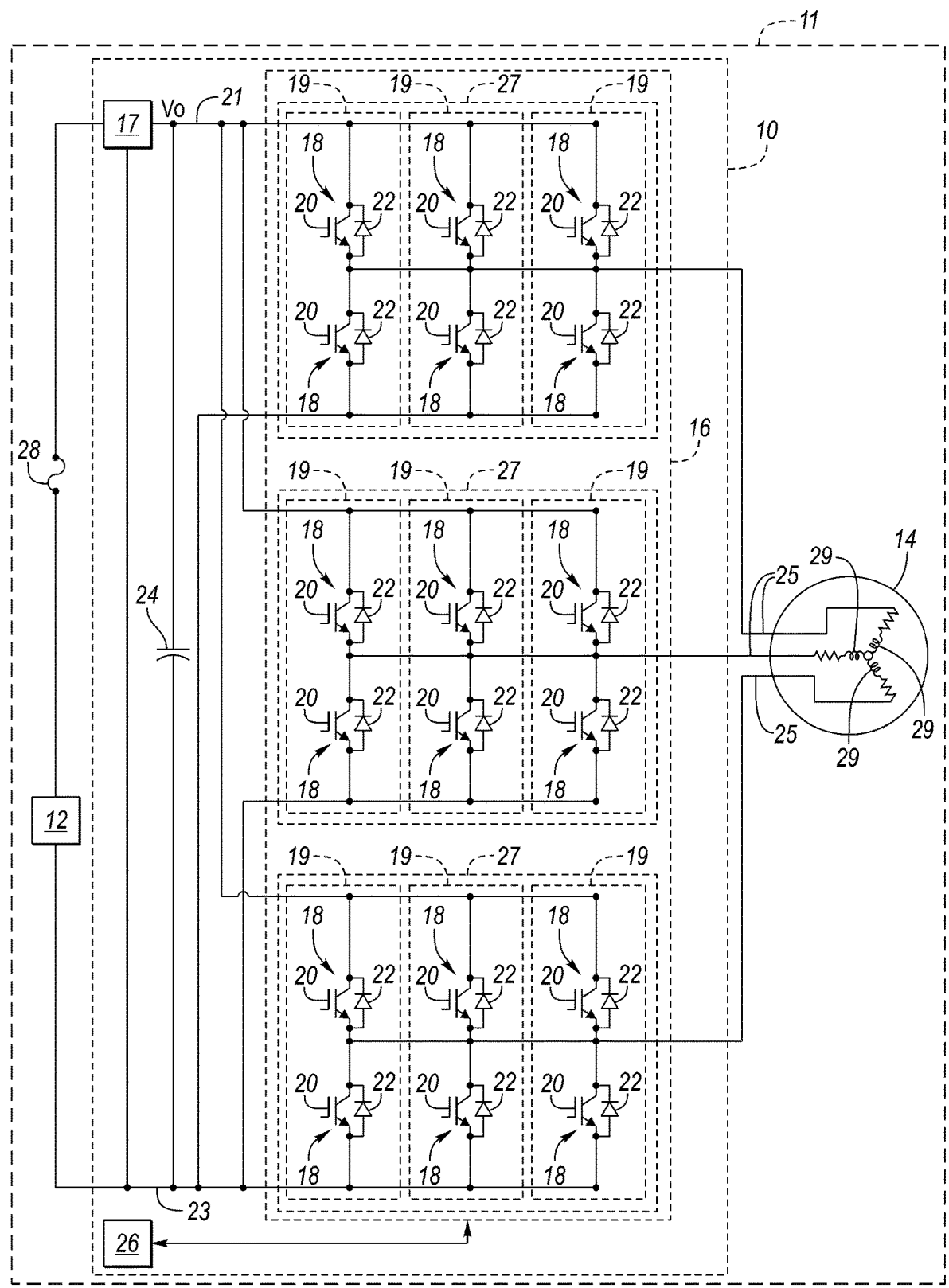
FIG. 1 is a circuit diagram of an inverter that is coupled to a DC power source and an electric machine.
Figure 2:
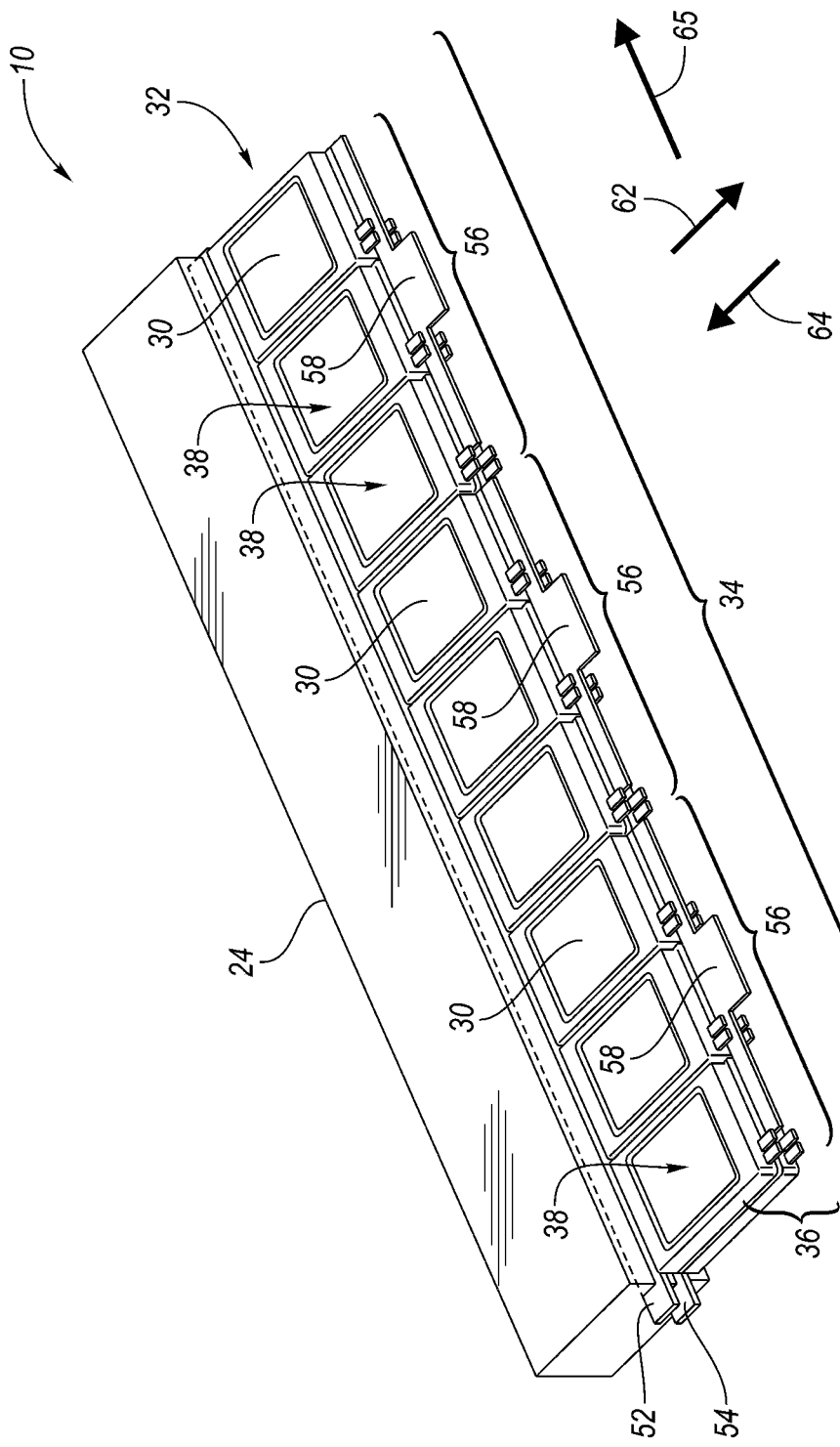
FIG. 2 is a top perspective view of the inverter.
Figure 3:
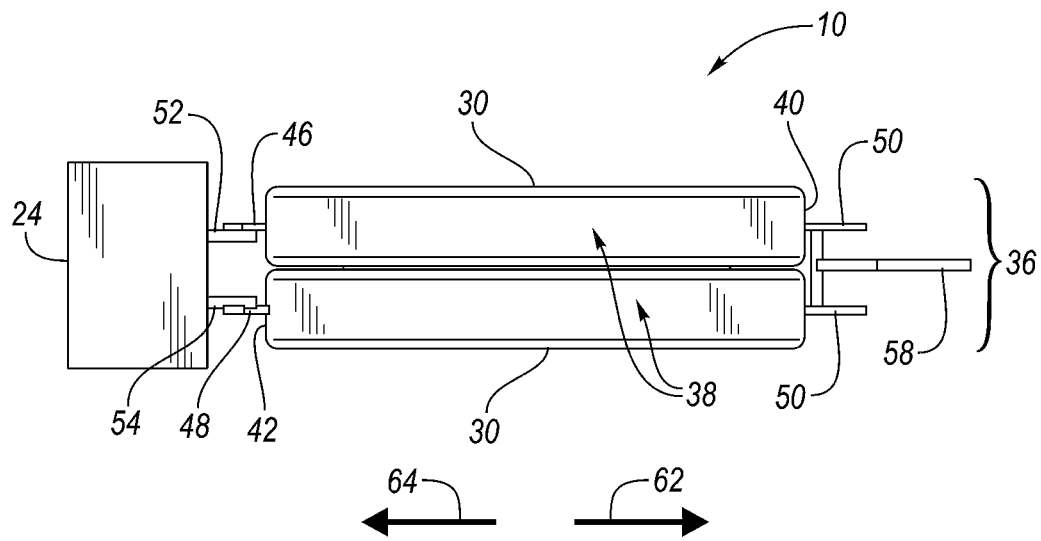
FIG. 3 is a side view of the inverter.
Figure 4:
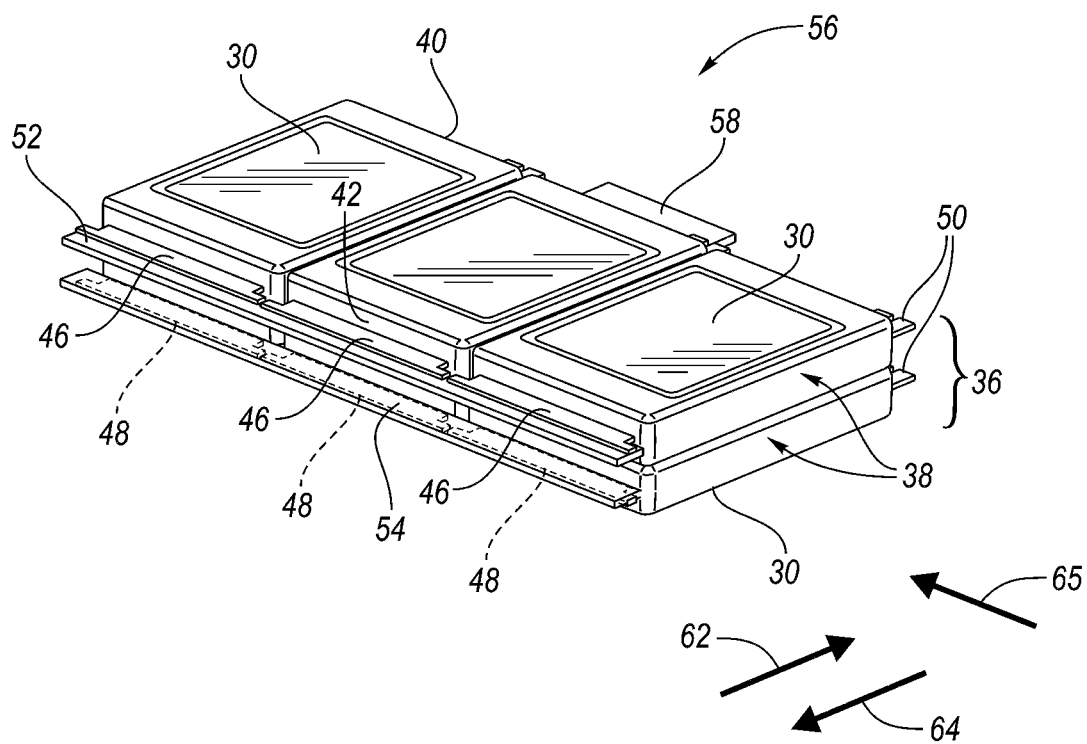
FIG. 4 is a rear perspective view of a portion of the inverter.
Figure 5:
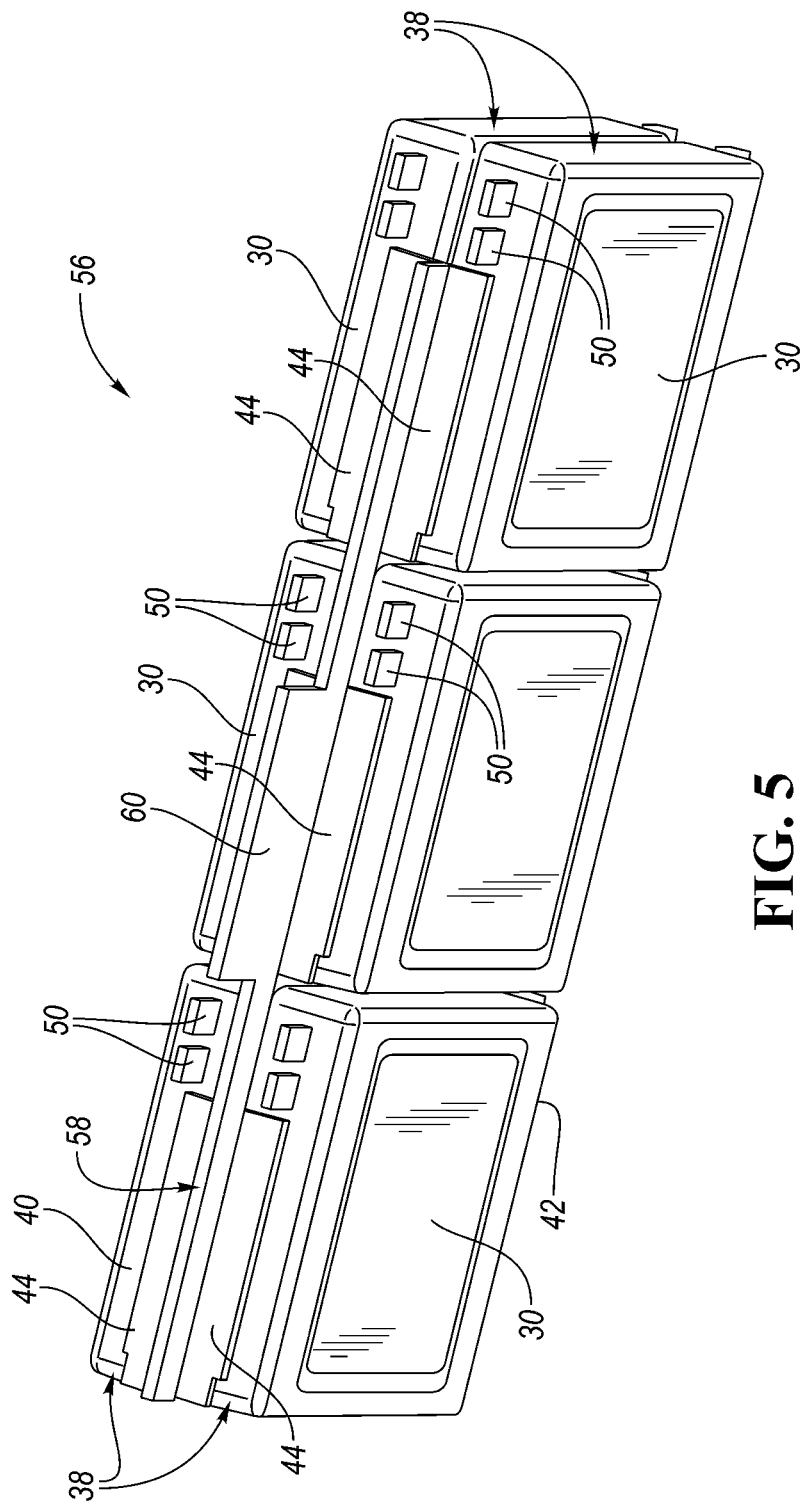
FIG. 5 is a front perspective view of the portion of the inverter.
Figure 6:
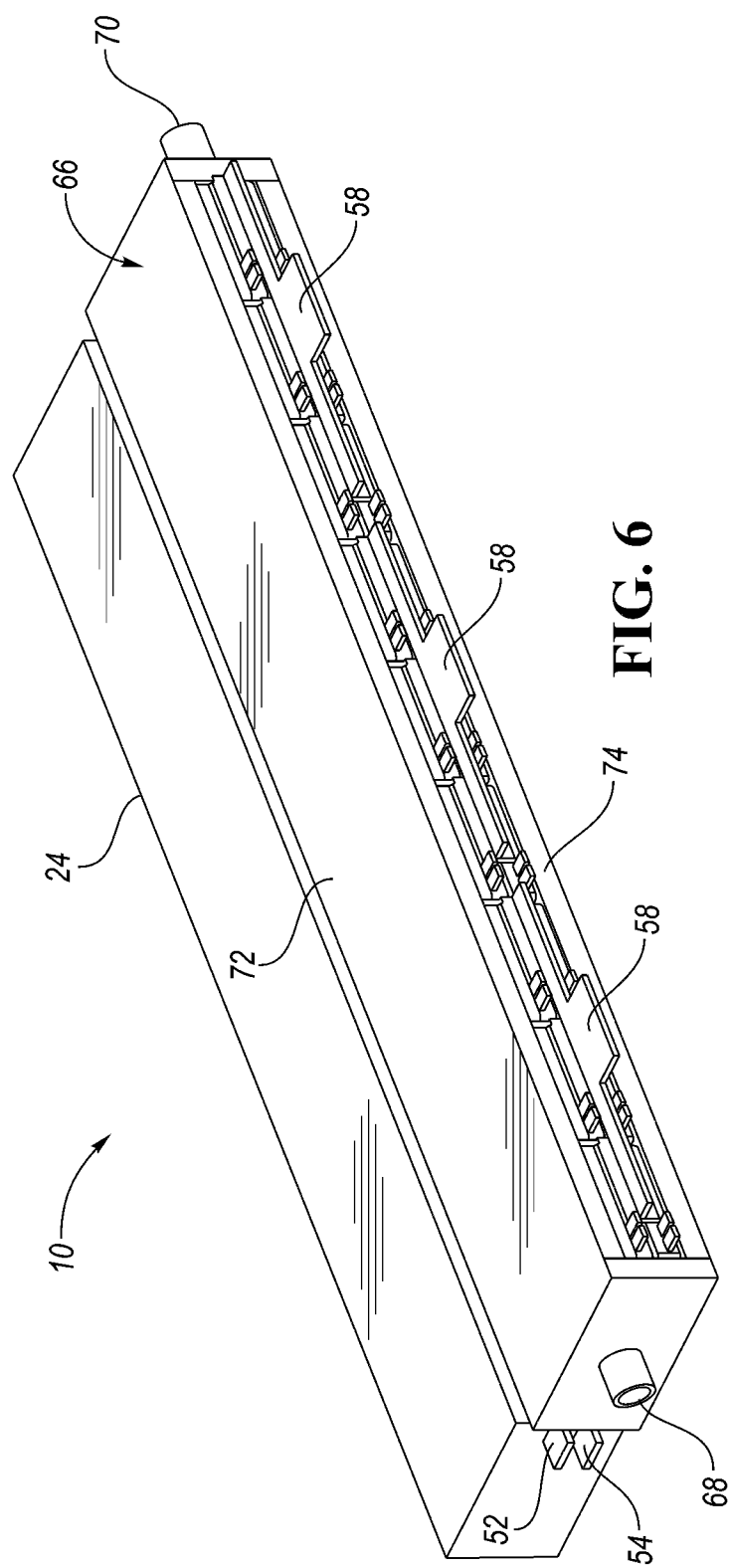
FIG. 6 is a top perspective view of the inverter further comprising a cooling manifold.

Referring to FIG. 1, a circuit diagram of an inverter 10 coupled to a power source 12 and an electric machine 14 is illustrated. The inverter 10 may also be referred to as a power controller, power module, or a power supply device. The electric machine may be an electric motor or a motor/generator combination. The inverter 10 may be utilized in an electric drive system of a vehicle 11, such as an electric or hybrid vehicle. The power source 12 may be coupled to the inverter 10 in order to drive the electric machine 14. In some contexts, including the context of an electric or hybrid vehicle, the power source 12 may be a battery, such as a traction battery that is configured to provide electrical power to the electric machine 14, and the electric machine 14 may be an electric motor or an electric motor/generator combination, that is configured to propel the vehicle 11. The inverter 10 may include inverting circuitry 16 and a voltage converter 17. The voltage converter 17 may be DC to DC converter. Alternatively, the voltage converter 17 may be a separate component that is not integral to the inverter 10. The inverting circuitry 16 and the voltage converter 17 may be configured to deliver electrical power to the electric machine 14.

The inverting circuitry 16 may include switching units 18. The switching units 18 may be referred to switching circuits or switches. The switching units 18 may each comprise a transistor 20, such as an insulated gate bipolar transistor (IGBT), in antiparallel with a diode 22. Alternatively, other types of circuits may be utilized, such as metal-oxide semiconductor field-effect transistors (MOSFETs), to form the switching units 18. Pairs 19 of the switching units 18 are arranged in series and extend between the positive DC bus 21 and negative DC bus 23 of the power source 12. The pairs 19 of switching units 18 each comprise a half-bridge 19 of the inverting circuitry 16. Each half-bridge 19 of a subset 27 of the switching units 18 is connected to one phase 29 of the electric machine 14 via an AC bus 25. The switching units 18 may be configured to provide AC power to the electric machine 14. More specifically, the inverting circuitry 16 may be configured to convert DC power provided by the power source 12 into AC power, which is then delivered to the electric machine 14. The inverter 10 may include at least one DC-link capacitor 24. The link capacitor 24 may be disposed between the power source 12 and the inverting circuitry 16. The link capacitor 24 also extends between the positive DC bus 21 and negative DC bus 23 of the power source 12. The link capacitor 24 may be configured to absorb ripple currents generated at the inverting circuitry 16 or the power source 12, and stabilize the DC-link voltage, Vo, for inverting circuitry 16 control. Stated in other terms, the link capacitor 24 may be arranged to limit voltage variation at an input of inverting circuitry 16 due to ripple currents generated by the inverting circuitry 16 or a battery, such as a traction battery, that may comprise the power source 12. The inverter 10 may include a drive board 26 for controlling the inverting circuitry 16. The drive board 26 may be a gate drive board that is configured to operate the transistors 20 of the switching units 18 when converting the DC power from the power source 12 into AC power and delivering the AC power to the electric machine 14.

The drive board 26 may be a controller that is part of a larger control system and may be controlled by various other controllers, such as a vehicle system controller (VSC). It should therefore be understood that the drive board 26 and one or more other controllers can collectively be referred to as a "controller." Such a controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller.

Control logic or functions performed by the controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer. The computer-readable storage devices or media may include one or more of a number of known physical devices which utilize electric, magnetic, and/or optical storage to keep executable instructions and associated calibration information, operating variables, and the like.

The controller may be configured to receive various states or conditions of the various components via electrical signals. The electrical signals may be delivered to the controller from the various components via input channels. Additionally, the electrical signals received from the various components may be indicative of a request or a command to change or alter a state of one or more of the respective components. The controller includes output channels that are configured to deliver requests or commands (via electrical signals) to the various vehicle components. The controller 24 control logic and/or algorithms that are configured to generate the requests or commands delivered through the output channels based on the requests, commands, conditions, or states of the various components.

The voltage converter 17 may include an inductor. The circuitry of the voltage converter (not shown), including the inductor, may be configured to amplify or increase the voltage of the electrical power being delivered to the electric machine 14 from the power source 12. A fuse 28 may be disposed on the direct current side of the inverting circuitry 16 to protect the inverting circuitry 16 from surges in electrical power.

The disclosure should not be construed as limited to the circuit diagram of FIG. 1, but should include power control devices that include other types inverting circuitry, capacitors, converters, or combinations thereof. For example, the inverting circuitry 16 may be an inverter that includes any number of switching units and is not limited to the number of switching units depicted in FIG. 1. As another example, the link capacitor 24 may include several capacitors as opposed to the single capacitor illustrated in FIG. 1.

The solution described herein has three short AC bus bars; has two simple DC bus bars consisting of a simple rectangular design; has a short electrical circuit loop having upper and lower power switching devices; eliminates the need for bus bars comprising large cooper sheets which in turn reduces expense; includes a simplified bus bar layout which in turn reduces manufacturing expense; and has a low loop inductance due of the short electrical circuit loop which in turn increases efficiency.

Referring to FIG. 2-6, the inventor 10 or portions thereof are illustrated in further detail. The inverter 10 includes a plurality of power cards 30. The power cards 30 are arranged in an array 32. The power cards 30 may also be arranged in rows 34 and columns 36. The rows 34 and columns 36 may be arranged according to the array 32. The power cards 30 may be arranged in a plurality of pairs 38. Each pair 38 may correspond to one of the columns 36. Each of the power cards 30 may have a proximal end 40 and a distal end 42. The proximal end 40 and the distal end 42 may be referred to as first and second ends, respectively, or vice versa. The proximal end 40 and the distal end 42 may alternatively be the ends of the pairs 38 or the columns 36 of power cards 30. Each power card 30 includes the circuitry (e.g., the switching units 18) that is configured to convert DC power into AC power.

AC outputs or AC output terminals 44 are connected to the switching units 18. The AC output terminals 44 are disposed along and extend from the proximal ends 40 of each of the power cards 30. Positive DC terminals, DC inputs, or DC input terminals 46 are connected to the switching units 18. The DC input terminals 46 are disposed along and extend from distal ends 42 of a first of the power cards 30 within each pair 38 or column 36 of the power cards 30. Negative DC terminals, DC outputs, or DC output terminals 48 are connected to the switching units 18. The DC output terminals 48 are disposed along and extend from distal ends 42 of a second of the power cards 30 within each pair 38 or column 36 of the power cards 30.

Control pins 50 are also connected to the switching units 18. The control pins 50 are disposed along and extend from the proximal ends 40 of each of the power cards 30. The control pins 50 may be connected to the drive board 26 such that drive board 26 operates the transistors 20 of the switching units 18 via the control pins 50 when converting the DC power from the power source 12 into AC power and delivering the AC power to the electric machine 14.

Each pair 38 or column 36 of the power cards 30 may include one DC input terminal 46, one DC output terminal 48, and an AC output terminal 44 for each of the power cards 30 within the pair 38 or column 36. The pairs 38 or columns 36 of the power cards 30 may be arranged according to the array 32 such that (i) the DC input terminals 46 extending from each of the pairs 38 or columns 36 of the power cards 30 are linearly aligned and (ii) the DC output terminals 48 extending from each of the pairs 38 or columns 36 of the power cards 30 are linearly aligned.

The link capacitor 24 is connected to each of the DC input terminals 46 and each of the DC output terminals 48. More specifically, the link capacitor 24 is connected to (i) each of the DC input terminals 46 via a first bus bar 52 and (ii) each of the DC output terminals 48 via a second bus bar 54. The first bus bar 52 may be referred to as the positive DC bus bar while the second bus bar 54 may be referred to as the negative DC bus bar. The first bus bar 52 may correspond to the positive DC bus 21 in FIG. 1 while the second bus bar 54 may correspond to the negative DC bus 23 in FIG. 1.

The first bus bar 52 may extend linearly between the linearly aligned DC input terminals 46. The second bus bar 54 may extend linearly between the linearly aligned DC output terminals 48. The first bus bar 52 and the second bus bar 54 may be in the shape of elongated plates or strips of material. The first bus bar 52 and the second bus bar 54 may be rectangular in shape. The first bus bar 52 and the second bus bar 54 may be substantially parallel to each other. As used herein, substantially parallel refers to any incremental angle that is between exactly parallel and 15° or less from exactly parallel (e.g., 12.5° or less from exactly parallel, 10° or less from exactly parallel, or 5° or less from exactly parallel).

The pairs 38 or columns 36 of the power cards 30 are arranged into subsets 56. Each subset 56 includes at least two of the pairs 38 or columns 36 of the power cards 30. Each AC output terminal 44 of each power card 30 within each subset 56 of the power cards 30 are connected to one of a plurality of AC phases (e.g., one phase 29 of the electric machine 14). More specifically, each AC output terminal 44 of each power card 30 within each subset 56 of the power cards 30 are connected to each other and to one the AC phases via an AC bus bar 58. The AC bus bars 58 may be in the shape of elongated plates or strips of material having a protruding middle region 60. The AC bus bars 58 may correspond to the AC buses 25 in FIG. 1. The subsets 56 of the power cards 30 may be aligned linearly (e.g., the subsets 56 of the power cards 30 may be aligned along an axis). The AC bus bars 58 connected to each subset 56 of the power cards 30 may also be aligned linearly (e.g., the AC bus bars 58 may be aligned along an axis).

The proximal end 40 and the distal end 42 of each power card 30 face opposing directions 62, 64, respectively. Also, it may be stated that the proximal end 40 and the distal end 42 of each of the pairs 38 or columns 36 of the power cards 30 face opposing directions 62, 64, respectively. The opposing directions 62, 64 may be substantially perpendicular to the array 32. More specifically, the opposing directions 62, 64 may be substantially perpendicular to the rows 34 or substantially perpendicular to a direction 65 in which the rows 34 are arranged. As used herein, substantially perpendicular refers to any incremental angle that is between exactly perpendicular and 15° or less from exactly perpendicular (e.g., 12.5° or less from exactly perpendicular, 10° or less from exactly perpendicular, or 5° or less from exactly perpendicular).

A cooling duct or cooling manifold 66 is disposed about the plurality of power cards 30 such that the cooling manifold 66 contacts exteriors surfaces of each of the power cards 30 other than the proximal and distal ends 40, 42. The cooling manifold 66 includes an inlet 68 and an outlet 70 for routing a cooling fluid though the cooling manifold 66. The cooling manifold 66 is configured to cool the power cards 30 and the circuitry disposed therein to ensure proper functionality. The cooling manifold 66 may include an upper duct 72 that extends between the inlet 68 and the outlet 70 along an upper side of the plurality of power cards 30. The cooling manifold 66 may also include a lower duct 74 that extends between the inlet 68 and the outlet 70 along a lower side of the plurality of power cards 30.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to propel the vehicle;
   a battery configured to provide electrical power to the electric machine; and
   an inverter configured to convert DC electrical power from the battery into AC electrical power and to deliver the AC electrical power to the electric machine, the inverter comprising (i) a plurality of power cards and (ii) at least one DC link capacitor, wherein (a) the plurality of power cards is arranged in a plurality of pairs, (b) AC output terminals are disposed along proximal ends of each power card, (c) DC input terminals are disposed along distal ends of a first of the power cards within each pair of the power cards, (d) DC output terminals are disposed along distal ends of a second of the power cards within each pair of the power cards, (e) the pairs of power cards are arranged in an array such that the DC input terminals are linearly aligned and the DC output terminals are linearly aligned, and (f) the at least one DC link capacitor is connected to each of the DC input terminals and each of the DC output terminals.

2. The vehicle of claim 1, wherein the inverter further comprises a linearly extending DC bus bar connected to (i) the DC link capacitor and (ii) one of (a) each of the DC input terminals and (b) each of the DC output terminals.

3. The vehicle of claim 2, wherein the inverter further comprises a second linearly extending DC bus bar connected to (i) the DC link capacitor and (ii) the other of (a) each of the DC input terminals and (b) each of the DC output terminals.

4. The vehicle of claim 3, wherein the linearly extending DC bus bar and the second linearly extending DC bus bar are substantially parallel.

5. The vehicle of claim 1, wherein (i) the plurality of pairs of the power cards are arranged into subsets that each include at least two of the pairs of power cards and (ii) each AC output terminal of each power card within each subset of the pairs of the power cards are connected to one of a plurality of AC phases.

6. The vehicle of claim 1, wherein (i) the proximal and distal ends of each power card face opposing directions and (ii) the opposing directions are substantially perpendicular to the array.

7. The vehicle of claim 1 further comprising a cooling manifold disposed about the plurality of power cards such that the cooling manifold contacts exteriors surfaces of each of the power cards other than the proximal and distal ends.

8. An inverter comprising:
a plurality of pairs of power cards arranged in an array, each pair having a proximal end and a distal end, wherein the pairs include (i) switches configured to convert DC power into AC power, (ii) DC inputs connected to the switches and extending from a first of the power cards within each pair along the distal ends, (iii) DC outputs connected to the switches and extending from a second of the power cards within each pair along the distal ends, and (iv) AC outputs connected to the switches and extending from the first and the second of the power cards within each pair along the proximal ends.

9. The inverter of claim 8 further comprising a linearly extending DC bus bar connected to one of (i) each of the DC inputs and (ii) each of the DC outputs.

10. The inverter of claim 9 further comprising a second linearly extending DC bus bar connected to the other of (i) each of the DC inputs and (ii) each of the DC outputs.

11. The inverter of claim 10, wherein the linearly extending DC bus bar and the second linearly extending DC bus bar are substantially parallel.

12. The inverter of claim 8, wherein (i) the plurality of pairs of power cards are arranged into subsets that each include at least two of the pairs of power cards and (ii) each AC output of each power card within each subset of the pairs of the power cards are connected to one of a plurality of AC phases.

13. The inverter of claim 8, wherein (i) the proximal and distal ends of each pair of power cards face opposing directions and (ii) the opposing directions are substantially perpendicular to the array.

14. The inverter of claim 8 further comprising a cooling manifold disposed about the plurality of pairs of power cards such that the cooling manifold contacts exteriors surfaces of each of the power cards other than the proximal and distal ends.

15. An inverter comprising:
a plurality of power cards arranged in columns and rows, wherein (i) each power card includes switches configured to convert DC power into AC power and (ii) each column includes (a) a DC input connected to the switches of the corresponding column and extending from a first of the power cards within the corresponding column along a first end of the corresponding column, (b) a DC output connected to the switches of the corresponding column and extending from a second of the power cards within the corresponding column along the first end of the corresponding column, and (c) an AC output connected to the switches of the corresponding column and extending from each of the power cards within the corresponding column along a second end of the corresponding column.

16. The inverter of claim 15 further comprising a linearly extending DC bus bar connected to one of (i) each of the DC inputs and (ii) each of the DC outputs.

17. The inverter of claim 16 further comprising a second linearly extending DC bus bar connected to the other of (i) each of the DC inputs and (ii) each of the DC outputs.

18. The inverter of claim 15, wherein (i) the plurality of power cards is arranged into subsets that each include at least two of the columns of power cards and (ii) each AC output of each power card within each subset of the power cards are connected to one of a plurality of AC phases.

19. The inverter of claim 15, wherein (i) the first and seconds ends of each column face opposing directions and (ii) the opposing directions are substantially perpendicular to the rows.

20. The inverter of claim 15 further comprising a cooling manifold disposed about the plurality of power cards such that the cooling manifold contacts exteriors surfaces of each of the power cards other than the first and second ends.

* * * * *